May 22, 1951 J. S. WARD ET AL 2,554,162
DYNAMOMETER FOR USE WITH BRAKE-TESTING APPARATUS
Filed Oct. 6, 1944 3 Sheets-Sheet 1
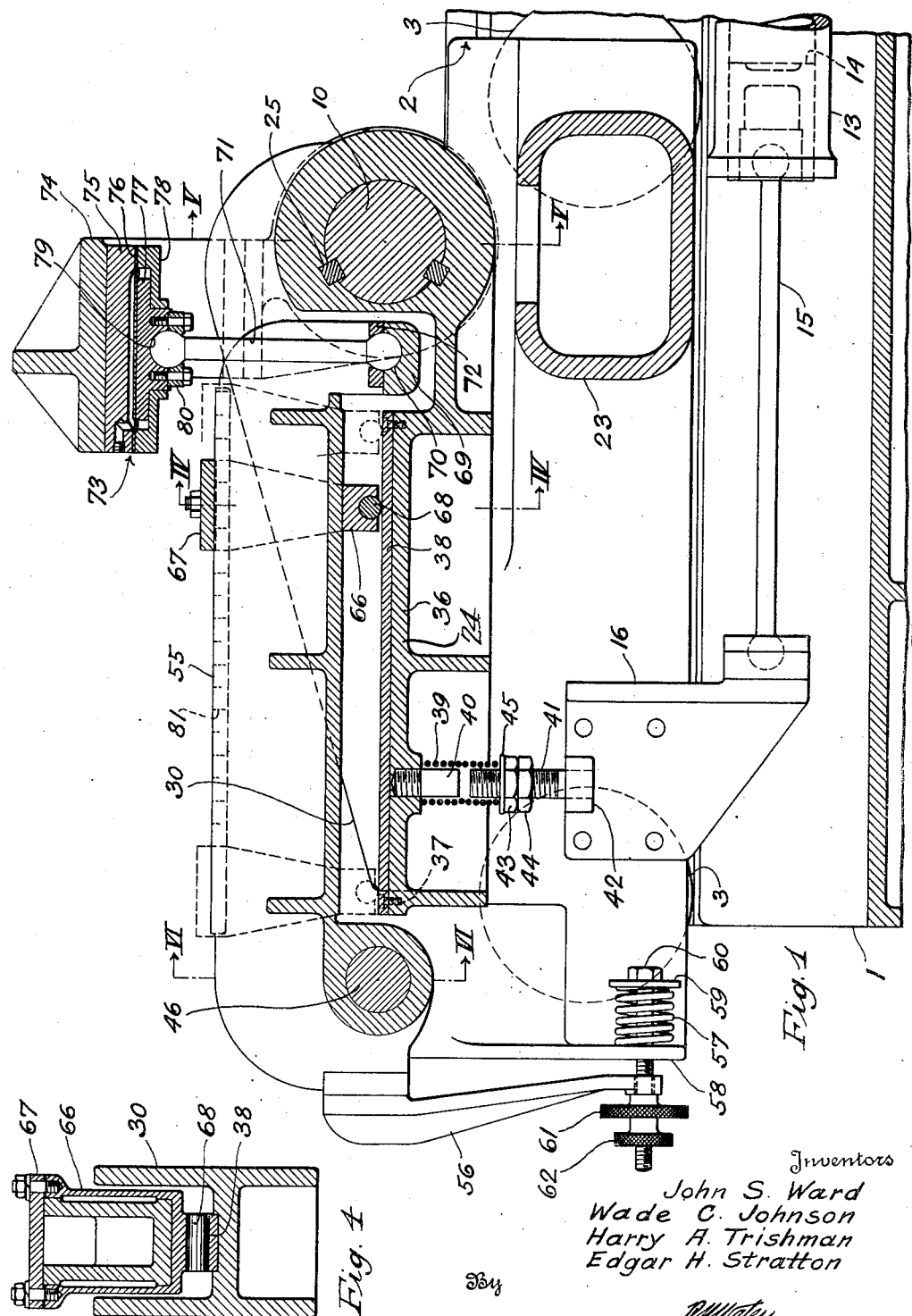
Inventors
John S. Ward
Wade C. Johnson
Harry A. Trishman
Edgar H. Stratton
By
R. W. Wales
Attorney

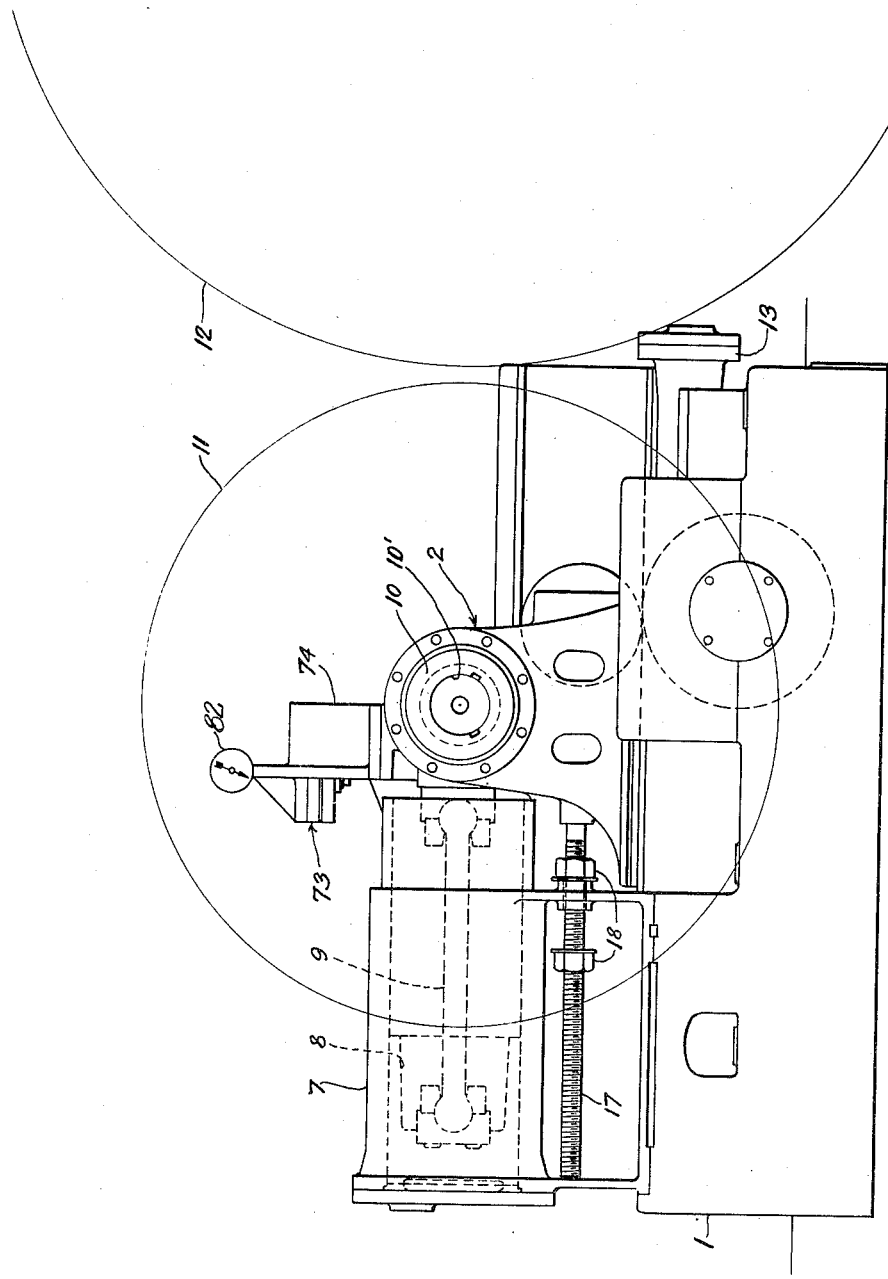

May 22, 1951  J. S. WARD ET AL  2,554,162
DYNAMOMETER FOR USE WITH BRAKE-TESTING APPARATUS
Filed Oct. 6, 1944  3 Sheets-Sheet 3

Inventors
John S. Ward
Wade C. Johnson
Harry A. Trishman
Edgar H. Stratton

By R. W. Walsh
Attorney

Patented May 22, 1951

2,554,162

UNITED STATES PATENT OFFICE 2,554,162

DYNAMOMETER FOR USE WITH BRAKE-TESTING APPARATUS

John S. Ward, Akron, Wade C. Johnson, Cuyahoga Falls, Harry A. Trishman, Hudson, and Edgar H. Stratton, Cuyahoga Falls, Ohio, assignors of one-half to Wingfoot Corporation, Akron, Ohio, a corporation of Delaware, and one-half to The Adamson Machine Company, Akron, Ohio, a corporation of Ohio Application October 6, 1944, Serial No. 557,406

7 Claims. (Cl. 73—133)

This invention relates to torque or load measuring apparatus, and, in particular, to a brake dynamometer.

Dynamometers used prior to this invention have been relatively expensive and of a more or less complicated character. Nor have they been adapted to be employed within a wide variation of torque and for heavy duty.

It is the general object of the invention to avoid and overcome the foregoing and other difficulties of and objections to prior art devices by the provision of a simple, rugged, and compact construction adjustable for a wide range of torque.

Another object of this invention is to provide means for increasing the torque in the torque shaft at a constant applied force.

Another object of this invention is to provide a variable transmission ratio between the applied force and the torque shaft by a mere adjustment.

Another object of this invention is the provision of a force transmission lever system in which the variation of the active leverage of one lever changes the active leverage of another lever.

The aforesaid objects of the invention, and other objects which will become apparent as the description proceeds, are achieved by providing between the torque shaft and a pressure cell a pair of cooperative levers in parallel relation to each other, one of the levers, hereinafter called the torque arm, being keyed to the rotatable torque shaft to which the brake to be tested is attached, and the other lever, the transmission lever, being fixed to a rotatable shaft parallel to and spaced from the torque shaft. The free end of the transmission lever is operatively connected to a diaphragm pressure cell.

A fulcrum, slidable on and fixable to one of the levers and contacting the other lever, is adapted to vary the ratio of the active leverage of the levers, and, thereby, the torque moment in the torque shaft in a most simple manner, whereby the torque measuring capacity can be multiplied many times.

For a better understanding of the invention, reference should be had to the accompanying drawings, wherein:

Fig. 1 is a fragmentary longitudinal cross-sectional view of a brake-testing apparatus in connection with one embodiment of the invention;

Fig. 2, in smaller scale, is a full side view of the apparatus;

Fig. 3, in smaller scale, is a full end view of Fig. 1;

Fig. 4 is a cross-sectional view taken on line IV—IV of Fig. 1;

Figure 5:
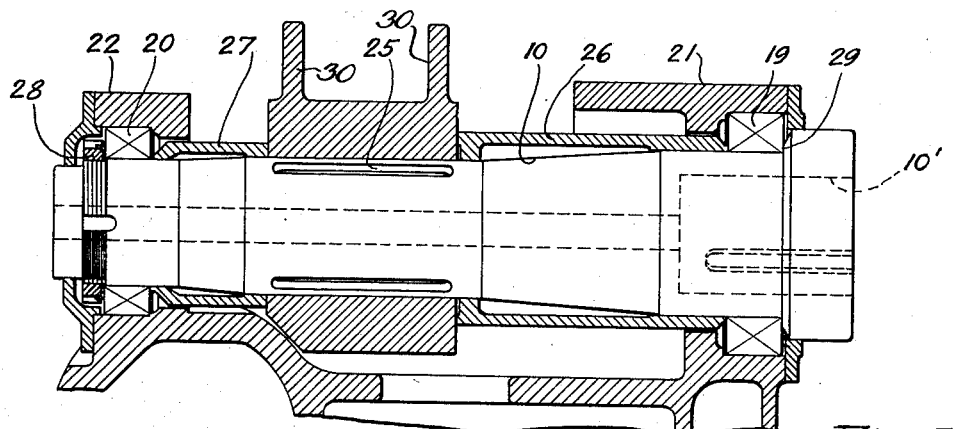
Fig. 5 is a cross-sectional view taken on line V—V of Fig. 1.
Figure 6:
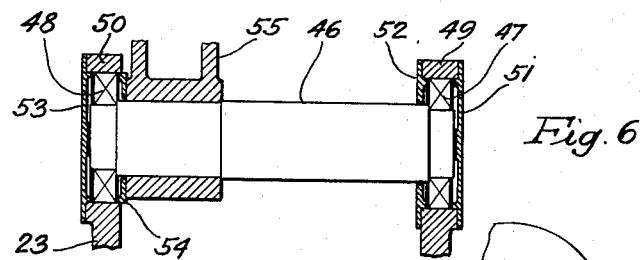
Fig. 6 is a cross-sectional view taken on line VI—VI of Fig. 1.
Figure 3:
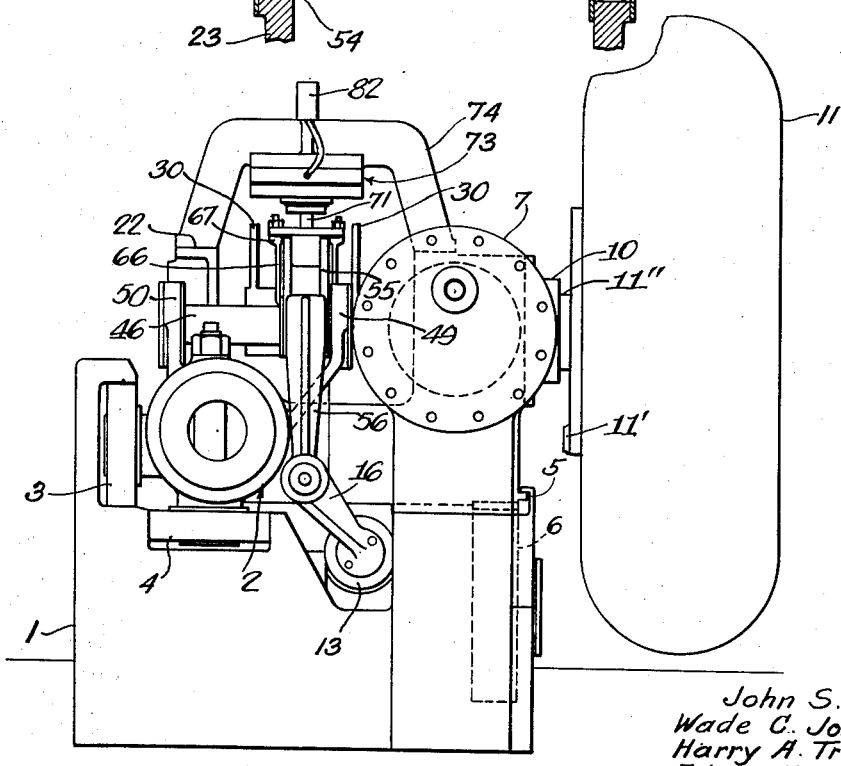

Although the principle of the invention is applicable to any torque-testing device, it is illustrated in connection with a tire brake-testing apparatus adapted for the medium size truck tire, as well as the giant airplane tire, and will be so described.

With specific reference to the form of the invention illustrated in the drawings, the numeral 1 indicates the fixed base of a brake-testing apparatus, and 2, as a whole, a dynamometer carriage supported and guided at one side of base 1 by rolls 3 and 4 attached to the carriage 2, being guided at the other side of the base in a groove 5 and supported by a roll 6 journaled in the base.

To the base is fixed a large pressure cylinder 7 in which is slidable a piston 8 pivotally connected, by a rod 9, to the carriage 2. Mounted on carriage 2 is a torque shaft 10, the free end of which is provided with a socket 10' on which is rotatably mountable a pneumatic tire wheel 11, and a non-rotatable wheel brake 11. It will be understood that a stub axle 11" rotatably carrying the wheel 11 is received and locked in the socket 10' and that the stub axle carries non-rotatable or fixed brake elements 11' which are adapted to be energized by conventional means (not shown) to clamp on a rotatable brake drum or disc carried by the wheel 11.

For operation, the carriage is moved toward an energized flywheel 12 by the piston 8 to make adequate contact of the tire with the flywheel. After the brake is applied and has stopped the flywheel, a second compressed air cylinder 13 attached to the base, returns the carriage to its original position by the piston 14 and its rod 15 pivotally connected with one end to the bracket 16 attached to the carriage 2. A threaded rod 17 provided with adjustable stop nuts 18 (Fig. 2) and passing through the support of the cylinder 7 permits the limitation of possible movement of the carriage in both directions.

To provide the desired torque in the torque shaft 10, which is rotatably supported for least friction, by roller bearings 19 and 20 inserted in the bearing housings 21 and 22, respectively, integral with the carriage 2, a torque arm 24 is fastened to the shaft 10 by keys 25 and secured against shifting by sleeves 26 and 27, a lock nut 28, and the shoulder 29 at the large end of the shaft. The torque arm includes two spaced side ribs 30 connected by a reinforced horizontal web 36 on the upper surface of which is fastened by screws 37 a hardened steel plate 38 having a ground top surface which lies substantially in the plane going through the centers of the torque and of the transmission shaft. The weight of the arm 24 is equalized by a spring 39 which is held by a stud pin 40 screwed into the bottom of the arm and by a stud pin 41 screwed into a lug 42 of the bracket 16, and provided with an adjustable nut 43, a counter-nut 44, and a washer 45 as spring seat.

At the same level as that of the torque shaft and spaced parallel thereto is arranged a shaft 46 swingable in roller bearings 47 and 48 supported in housings 49 and 50, respectively, integral with the carriage 2, and enclosed by covers 51, 52; and 53, 54, respectively. On the shaft 46 is press-fit mounted a transmission lever 55 of U-shaped cross-section which comes to lie above parallel with and spaced from but between the flanges of the torque arm and moves therewith in the same vertical plane, but in a rotational direction opposite thereto. For balancing the weight of the lever 55 it is provided with a vertical equalizer arm 56 attached thereto at its supported end and the free end of the equalizer is acted upon by a spring 57 placed between a support 58 on the carriage frame 2 and a washer 59 resting against the head of a bolt 60 which passes through the support 58 and the arm 56, against which the pressure of the spring can be regulated by a hand nut 61 secured by a hand nut 62. On the transmission lever 55 is movably mounted a yoke 66 adjustably fixed thereto against undesirable shifting by tightening a plate 67 against the lever by means of stud bolts screwed into the yoke. Into the bottom of the yoke is pressed a hardened and ground steel pin 68, a cylindrical portion of which is to act as fulcrum against the ground surface of the plate 38 of the torque arm. The downwardly extending free end 69 of the transmission lever 55 is provided with a ball socket 70 the center of which being substantially at the same level as the top surface of the plate 38 and into which fits one end of a connecting rod 71, held therein by a split socket plate 72. The other end of the connecting rod is attached to a pressure cell 73, designated as a whole, which is fastened to a cross-piece 74 supported by the bearing housings 21 and 22, respectively, of the torque shaft. This pressure cell consists of a base 75, into which is fed the operating liquid and a diaphragm 76 in contact with a pressure plate 77 which rests on a retaining ring 78 pressing the diaphragm as a seal against the base 75. The other end of the connecting rod fits into the socket 79 of the pressure plate 77 and is held therein by a split socket plate 80. The pressure available in the pressure cell can be many times multiplied by the fulcrum 68 movable along the transmission lever depending on its distance from the fixed position of the socket 70 in the transmission lever. The farther the fulcrum is moved away from the axis of shaft 10, the greater will be the leverage acting upon the torque arm. Simultaneously, the active leverage of the torque arm will be increased and, thereby, the torque moment in the torque shaft when the brake to be tested is applied. For indicating the torque moment for each position of the fulcrum, the transmission lever is provided with a graduation 81 in pound-feet, or in total leverage ratio, which, when multiplied with the total pressure exerted by the cell, usually indicated by a gauge 82, gives the actual torque moment in the torque shaft and multiplied with the time needed for stopping the wheel, the performance of the brake.

Even though it is believed the operation of the apparatus will be apparent from the foregoing description, a brief review thereof will now be made for purposes of summary and simplification. It should be pointed out in particular that the construction of the present invention is most clear and simple since it consists of a few parts only, which, however, permit a wide torque variation.

In operating the apparatus, the torque moment for which the brake to be tested will be set is first determined and, accordingly, the fulcrum is positioned at the proper graduation line on the transmission lever. The carriage, to which the rotatable wheel with tire and fixed brake is attached on the torque shaft, is then moved by the large pressure cylinder against the flywheel, which has been energized in accordance with the work the brake is to absorb within a given time, until a tire load is reached corresponding, for instance, to that of an airplane wheel under ground service conditions. This can be achieved automatically by regulating the pressure in the operating cylinder. As soon as the wheel with the tire containing the brake drum begins to rotate at flywheel speed, the brake is applied with such a force that the torque arm has a tendency to lift the pressure plate in the pressure cell from its seat, or, in other words, the force applied to the lever system of the dynamometer counterbalances the brake moment. After a test, the dynamometer carriage is returned to its original position by the smaller pressure cylinder. The possible travel of the dynamometer carriage is sufficiently large to permit the testing of wheels of very large and also of relatively small diameter. In each case stop nuts adjustable on the threaded rod fastened to the carriage limit the travel of the carriage in each direction.

It will be recognized that the objects of the invention have been achieved by a construction using a simple and unique lever system in connection with a fulcrum adjustable thereon and operative therewith for varying the torque moment within a wide range. It should be noted, however, that the invention as illustrated is not to be limited to dynamometers for wheel brake testing apparatus, but may be used for measuring the torque for any purpose and in connection with any machinery.

While, in accordance with the patent statutes, one best known embodiment of the invention has been illustrated and described in detail, it is to be particularly understood that the inventive scope is defined in the appended claims.

We claim:

1. In combination, a brake-testing apparatus including a carriage movable on a bed plate and a dynamometer on said carriage, said dynamometer comprising a rotatable torque shaft adapted for coupling therewith a freely rotatable power driven wheel including a friction surface and a brake to be tested in fixed relation to said shaft and engageable with said friction surface, a torque arm securely fastened to said shaft, a second shaft spaced from but parallel to said torque shaft, a force transmission lever having its bottom vertically spaced from and parallel to said torque arm over substantially the full length of said torque arm, said force transmitting arm being swingable about the longitudinal axis of said second shaft and in the same plane as the torque arm, a single fulcrum releasably secured to said transmission lever and adjustable longitudinally thereof in operative contact with said torque arm for varying the active leverage of said transmission lever and of said torque arm, a pressure cell in fixed position relative to the centers of said shafts and in the vertical plane of the longitudinal centerlines of said torque arm and said force transmitting lever, and means operatively connecting the free end of said transmission lever with said pressure cell for providing the force for equalizing the torque in said torque shaft caused by applying the brake.

2. A dynamometer comprising a rotatable torque shaft having an arm secured thereto, a second shaft at a fixed distance from said torque shaft and parallel thereto at substantially the same horizontal level having a securely attached force transmission lever, said arm and said lever being vertically spaced from and parallel to each other and swingable in the same plane together with their respective shafts, said torque arm having a horizontal operating surface extending substantially the full length thereof, and said transmission lever being provided with parallel top and bottom faces substantially extending the full length thereof, a single fulcrum detachably clamped to both parallel surfaces of said transmission lever and adjustable longitudinally thereof and in operative contact with the operating surface of said torque arm for varying the active leverage of said arm and said lever over substantially the full distance between said shafts in accordance with a predetermined torque moment set up in said torque shaft, said fulcrum having a yoke member engaged with the sides and bottom of said transmission lever and carrying a hardened metal pin on its lower portion to form the fulcrum contact with said arm, and a pressure cell in fixed position relative said shafts pivotally connected with the free end of said transmission lever substantially in line with the operating surface of said torque arm.

3. A dynamometer comprising a rotatable torque shaft having a cantilever arm secured thereto and a rotatable transmission shaft having a lever secured thereto at one end of the lever, both shafts being a fixed distance apart from each other in a substantially horizontal plane, said arm having an operating surface on and extending over substantially the full length of said arm in said plane, said lever having spaced longitudinal surfaces extending substantially over the full length of said lever and vertically spaced from said surface of said arm with said lever reaching over above said arm and lying in a vertical plane therewith, said operating surface of said arm being adjacent a surface of said lever, a single fulcrum clamped detachably to the parallel faces of said lever and being adjustable over substantially the full length thereof in cooperating contact with only the operating surface on said arm, and a pressure cell in fixed position relative to said shafts pivotally connected with the free end of and in the center of said transmission lever extending downwardly substantially in line with the plane passing through said shafts.

4. A torque dynamometer including a carriage, a torque shaft journaled on the carriage, a torque arm secured to the shaft, a second shaft journaled on the carriage parallel to the torque shaft adjacent the end of the torque arm, a lever arm secured to the second shaft and extending substantially parallel to the torque arm, a fulcrum positioned between the arms and movable to any selected position therebetween over substantially the full length of the arms, said fulcrum being carried by one of said arms and contacting only the adjacent surface of the other said arm, a pressure cell mounted on the carriage and connected to the end of the lever arm, and means for indicating pressures in the cell.

5. A torque dynamometer including a carriage, a torque shaft journaled on the carriage, a torque arm secured to the shaft, a second shaft journaled on the carriage parallel to the torque shaft adjacent the end of the torque arm, a lever arm secured to the second shaft and extending substantially parallel to the torque arm, both of the arms being substantially channel-shaped in cross section but of different sizes so that one lies inside the other in operation, a fulcrum positioned between the arms and movable to any selected position therebetween over substantially the full length of the arms, said fulcrum being carried by one of said arms and contacting only the adjacent surface of the other said arm, a pressure cell mounted on the carriage and connected to the end of the lever arm, and means for indicating pressures in the cell.

6. In combination, a torque shaft, a lever securely fastened to said torque shaft, a second shaft spaced from said torque shaft, a lever swingable about the axis of said second shaft in the same plane as said torque lever and between said shafts but in a rotational direction opposite to that of said torque lever, straight, substantially horizontal surfaces on said levers spaced from and parallel to each other, one of them lying in the plane through the center of said shafts, and a single fulcrum fastened detachably to one of said levers and variable in its position longitudinally along substantially the entire length thereof and in operative contact with the horizontal surface in said plane of said other lever to vary the active leverage of both of said levers, said fulcrum including a yoke engaged with the bottom and sides of one of said levers and having a removable clamping plate secured to the upper ends of the yoke to position it on such lever and a metal pin fixed at the bight of the yoke for fulcrum contact with the other of said levers.

7. A torque dynamometer including a support, a torque shaft journaled on the support, a torque arm secured to the shaft, a second shaft journaled on the support parallel to the torque shaft adjacent the end of the torque arm, a lever arm secured to the second shaft and extending substantially parallel to the torque arm, said lever arm and torque arm having opposed substantially parallel surfaces, a fulcrum positioned between the arms and contacting only the opposed substantially parallel surfaces thereof and movable to any selected position therebetween over substantially the full length of the arms, a pressure cell mounted on the support and connected to the end of the lever arm, and means for indicating pressures in the cell upon the application of torque to the torque shaft in a direction to move the torque arm towards the lever arm.

JOHN S. WARD.
WADE C. JOHNSON.
HARRY A. TRISHMAN.
EDGAR H. STRATTON.

(References on following page)

REFERENCES CITED

The following references are of record in the file of this patent:

UNITED STATES PATENTS

| Number | Name | Date |
|---|---|---|
| 1,107,619 | Kuhner | Aug. 18, 1914 |
| 1,490,899 | Scott | Apr. 15, 1924 |
| 1,733,642 | Beduorz | Oct. 29, 1929 |
| 1,775,075 | Watson et al. | Sept. 2, 1930 |
| 1,872,495 | Pfeiffer | Aug. 16, 1932 |
| 2,126,157 | Von Thungen | Aug. 8, 1938 |
| 2,248,322 | Annin | July 8, 1941 |
| 2,250,941 | Zimmerman | July 29, 1941 |
| 2,336,838 | Bennett | Dec. 14, 1943 |